United States Patent [19]
Horlacher

[11] Patent Number: 5,595,150
[45] Date of Patent: Jan. 21, 1997

[54] AIR INTAKE SYSTEM WITH A THROTTLE VALVE FOR A MULTI-CYLINDER INTERNAL-COMBUSTION ENGINE

[75] Inventor: Wolfgang Horlacher, Gerlingen, Germany

[73] Assignee: Dr. Ing h.c.F. Porsche AG, Weissach, Germany

[21] Appl. No.: 444,102

[22] Filed: May 18, 1995

[30] Foreign Application Priority Data

May 19, 1994 [DE] Germany .......................... 44 17 472.1

[51] Int. Cl.⁶ .................................................. F02B 27/02
[52] U.S. Cl. .................. 123/184.36; 123/184.57
[58] Field of Search ......................... 123/184.57, 184.59, 123/184.36

[56] References Cited

U.S. PATENT DOCUMENTS

| | | | |
|---|---|---|---|
| 3,840,042 | 10/1974 | Brundage | 137/327 |
| 4,641,610 | 2/1987 | Rutschmann | 123/184.57 |
| 4,803,961 | 2/1989 | Hiraoka et al. | 123/184.59 |
| 5,056,473 | 10/1991 | Asaki et al. | 123/184.57 |
| 5,133,308 | 7/1992 | Hitomi et al. | 123/184.57 |
| 5,406,913 | 4/1995 | Rutschmann | 123/184.36 |

FOREIGN PATENT DOCUMENTS

| | | |
|---|---|---|
| 0167794 | 1/1986 | European Pat. Off. . |
| 0223378 | 5/1987 | European Pat. Off. . |
| 2932089 | 2/1981 | Germany . |
| 3711859A1 | 10/1987 | Germany . |
| 4032727A1 | 4/1991 | Germany . |
| 4315129 | 11/1994 | Germany . |
| 3-9024 | 1/1991 | Japan . |
| 3-88913 | 4/1991 | Japan ............................... 123/184.57 |
| 2096740 | 10/1982 | United Kingdom . |

OTHER PUBLICATIONS

Patent Abstracts of Japan—vol. 11, No. 318 (M–632) (2765) 16. Oct. 1987 & JP-A-62 101 821 (Honda) 12. May 1987—Abstract.

*Primary Examiner*—David A. Okonsky
*Attorney, Agent, or Firm*—Evenson, McKeow, Edwards & Lenahan

[57] ABSTRACT

An air intake system comprises a connection pipe which is arranged between opposing resonance containers. Inside the connection pipe, a swivellable throttle valve is provided which is inserted into the connection pipe by way of an opening in the connection pipe. The opening is closed by a bearing support which is held on the connection pipe by fasteners. The throttle valve and the bearing support form a prefabricated constructional unit.

20 Claims, 3 Drawing Sheets

AIR INTAKE SYSTEM WITH A THROTTLE VALVE FOR A MULTI-CYLINDER INTERNAL-COMBUSTION ENGINE

BACKGROUND AND SUMMARY OF THE INVENTION

This invention relates to an air intake system of a multi-cylinder internal-combustion engine having a connection pipe arranged between opposite resonance containers which communicate with respective cylinders by way of suction pipes, a swivellable throttle valve inserted into an opening in the connection pipe, and a bearing support fastened to the connection pipe closing the opening.

The air intake system of German Patent Document DE-P 43 15 129.9-13, which is not a prior publication, and corresponding U.S. Pat. No. 5,406,913, is a model of an air intake system having an increased mean pressure over the entire rotational speed range. Thus, an increased amount of fresh air is supplied to each cylinder which results in a clear improvement of the volumetric efficiency. In this case, a throttle valve in a connection pipe is switched in a targeted manner between two resonance containers.

It is an object of the present invention to optimize an air intake system having a throttle valve constructively as well as with respect to manufacturing techniques, while maintaining excellent functionality and efficiency.

This object has been achieved according to the present invention by providing in an air intake system having a connection pipe arranged between opposite resonance containers, a swivellable throttle valve which is inserted into the connection pipe through an opening, and a bearing support which is fastened to the connection pipe, closing the opening.

The throttle valve is mounted in the connection pipe, which can be constructed in one piece, in a simple manner using a bearing support. The bearing support, which is constructed as a separate component, has minimal space requirements and can easily be integrated with the above-mentioned connection pipe. The bearing support and the throttle valve form a prefabricated constructional unit which can be installed within the scope of flexible manufacturing processes into the air intake system. A sealing gasket disposed between the bearing support and the connection pipe, as well as between the bearing support and a section supplementing the interior pipe wall of the connection pipe, ensure a gas-tight installation of the bearing support. The design of the bearing support allows the use of different materials, such as plastic or light metal.

To promote laminar flow through the connection pipe, the bearing support may be provided with a section which mirrors the interior of the connection pipe in the area of the opening, serving to reduce transitional surfaces in this area.

These and other objects, features and advantages of the present invention will become more readily apparent from the following detailed description when taken in conjunction with the accompanying drawings.

DETAILED DESCRIPTION OF THE DRAWINGS

Figure 1:
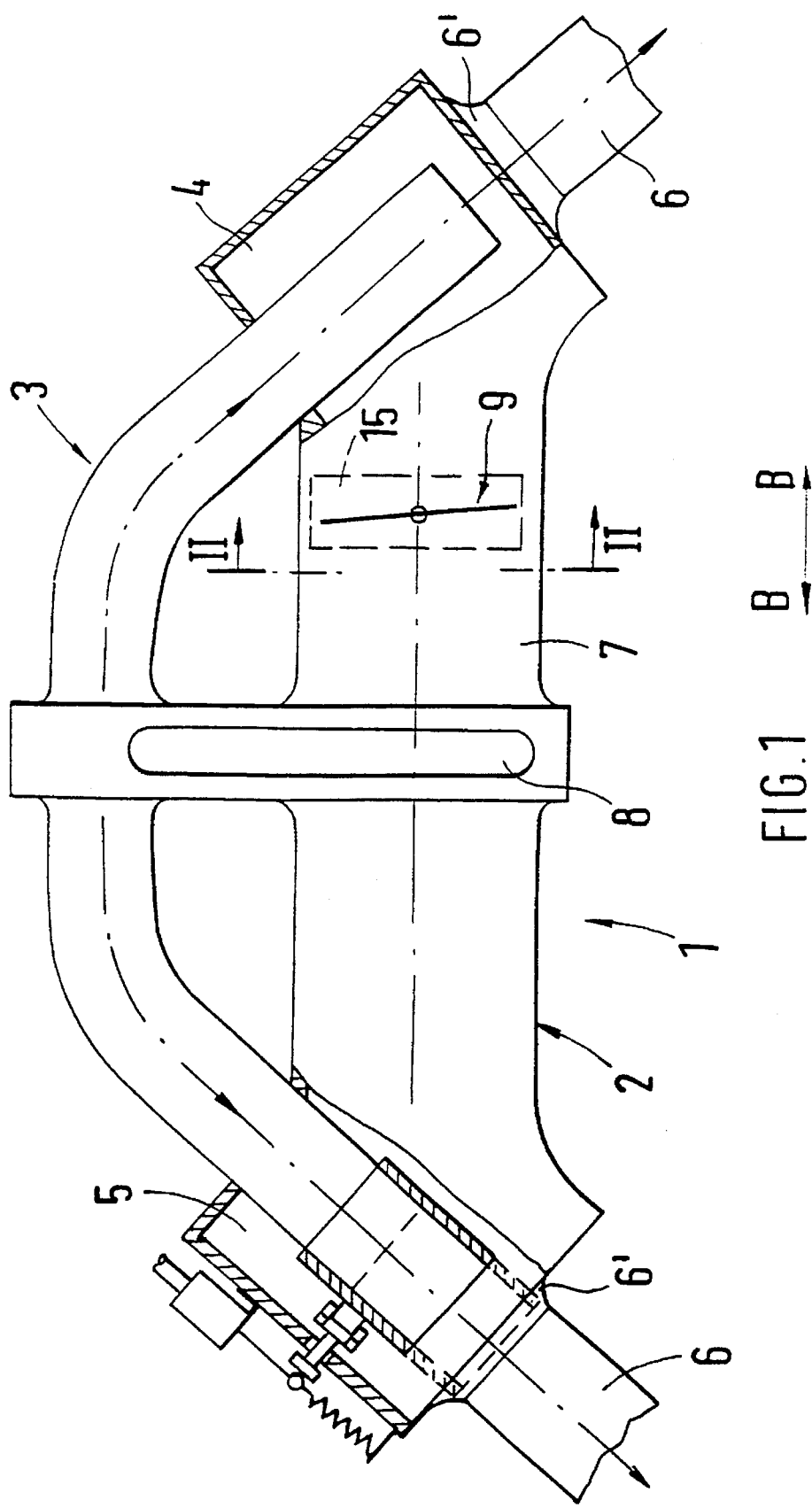
FIG. 1 is a schematic, partially sectional lateral view of an air intake system constructed according to the present invention.

An internal-combustion engine with two cylinder banks has an air intake system made of plastic or a light metal alloy which comprises a two-chamber resonance system 2 and a single-chamber ram pipe system 3.

The resonance system 2 is provided with resonance containers 4, 5 assigned to the cylinder banks. Individual suction pipes 6 which lead to cylinders of the internalcombustion engine are connected to the resonance containers 4, 5 by means of admission funnels 6'.

At least one one-piece connection pipe 7, to which air is supplied by way of a fresh air inlet 8, extends between the resonance containers 4,5. Inside this connection pipe 7, at least one swivellable throttle valve 9 is arranged which is operated by pressure element 10.

Figure 2:
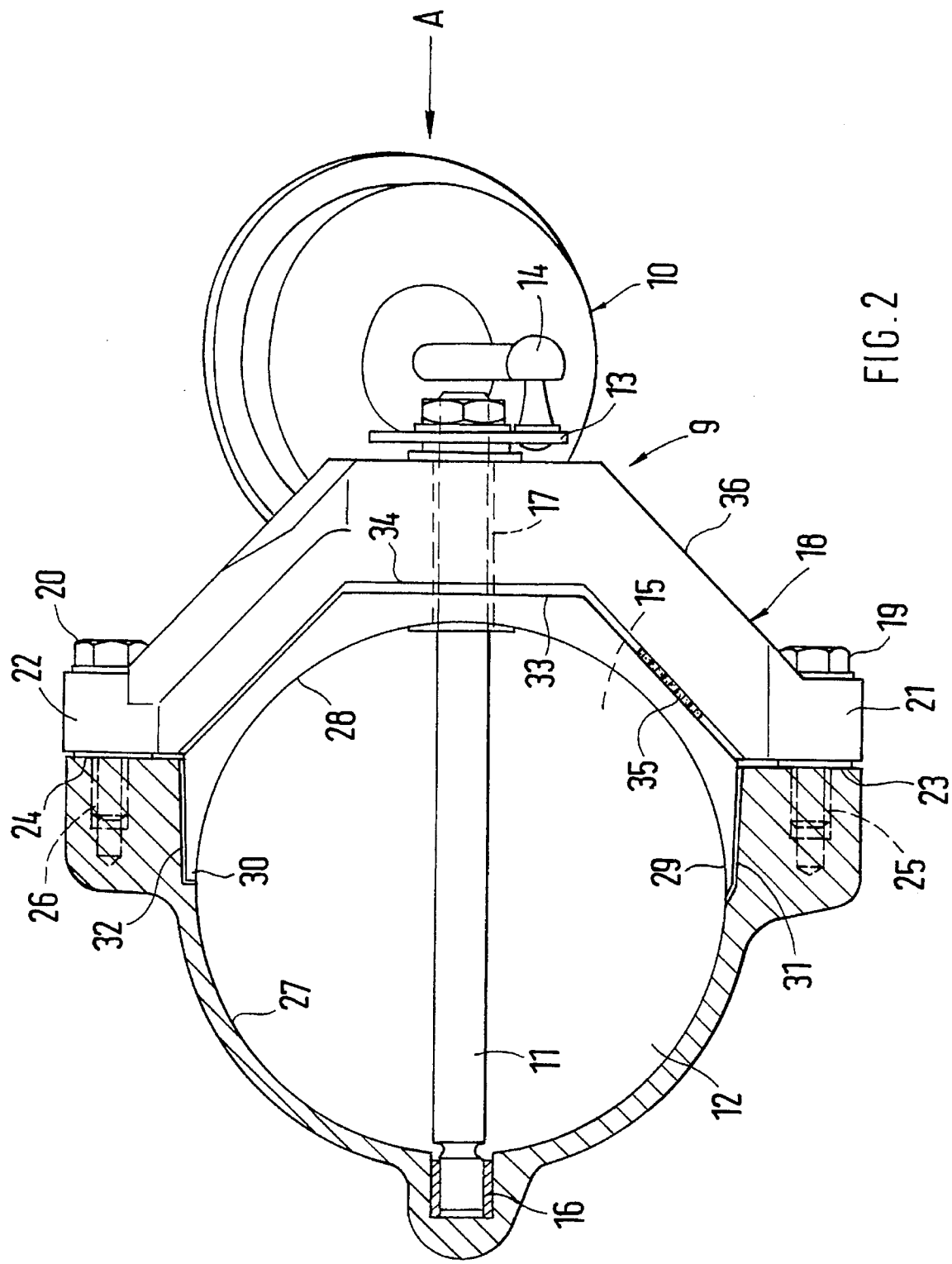
FIG. 2 is an enlarged sectional view along Line II—II of FIG. 1.

The throttle valve 9 comprises a bearing shaft 11, a flow-controlling throttle disk 12 and an operating lever 13 which is connected with the pressure element 10 by way of a linkage 14, as shown in FIG. 2.

By way of a slot-shaped opening 15 in the connection pipe 7, the bearing shaft 11 and the throttle disk 12 are inserted in the connection pipe 7. The opening 15 extends transversely with respect to the longitudinal direction B—B of the connection pipe 7.

In addition, on one side, the bearing shaft 11 is arranged in a first bearing bore 16 of the connection pipe 7 and, on the other side, it is arranged in a second bearing bore 17 of a bearing support 18 which closes the opening 15 and which is held on the connection pipe 7 by bolts 19, 20. For this purpose, the bearing support 18, which may be made of a plastic material or of a light-metal alloy, has spaced fastening lugs 21 which extend to corresponding receiving lugs 23, 24 of the connection pipe 7. The bolts 19, 20 are screwed into threads 25, 26 of the connection pipe 7.

So that a disturbance-free air flow is ensured in the area of the opening 15, the bearing support 18 is provided with a section 28 supplementing an inner pipe wall 27. Free ends 29, 30 of the section 28 cover the interior end wall areas 31, 32 of the connection pipe 7.

On the outside of the section 28, a first sealing surface 33 is provided, and a second corresponding sealing surface 34 of the bearing support 18 extends adjacent to the first sealing surface 33. Between the sealing surfaces 33, 34, a sealing gasket 35 is provided which is made of an elastic or dimensionally stable material. The two sealing surfaces 33, 34 have a generally half-hexagon shaped cross section corresponding to an outer boundary 36 of the bearing support 18.

Figure 3:
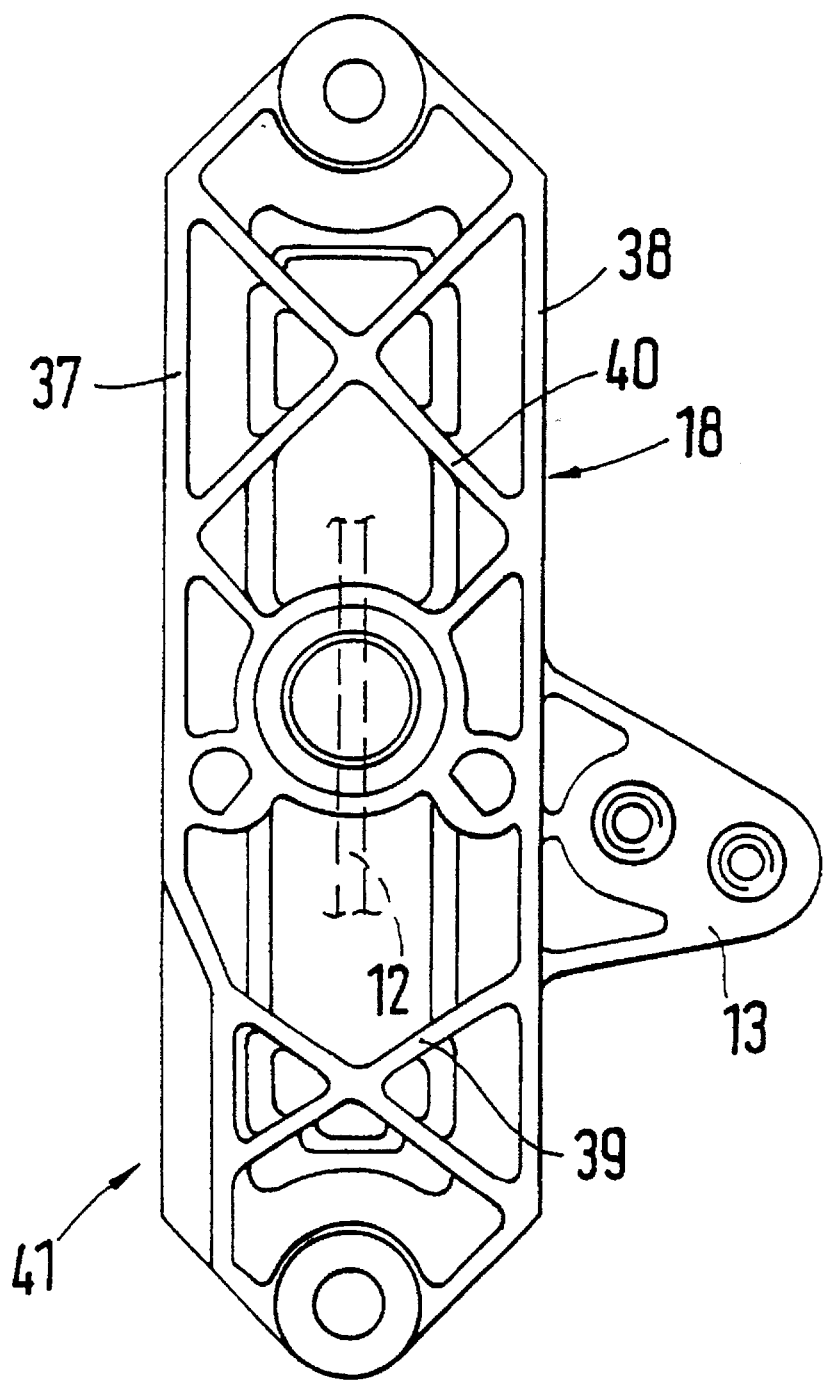
FIG. 3 is a partial sectional view in the direction of the arrow A of FIG. 2.

FIG. 3 shows that the bearing support 18 comprises webs 37, 38 which extend transversely to the longitudinal direction B—B of the connection pipe 7 and which are reinforced by ribs 39, 40 which extend between the webs 37, 38 in a grid-type manner.

The bearing support 18 and the throttle valve 9, which comprises the bearing shaft 11, the throttle disk 12 as well as the operating lever 13, form a prefabricated constructional unit 41 which is completely mounted onto the connection pipe 7.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. An air intake system of a multi-cylinder internal-combustion engine with two opposite cylinder banks and with suction pipes connecting the cylinder banks to respective resonance containers, comprising:

at least one connection pipe communicating the respective resonance containers, said connection pipe having an insertion opening and a bearing bore;

a bearing support which is fastened to the connection pipe and which closes said insertion opening, said bearing support having a bearing bore, and a swivellable throttle valve comprising a throttle disk and a bearing shaft;

wherein the throttle valve is inserted into the connection pipe through said insertion opening in the connection pipe;

and wherein the bearing shaft extends from said bearing bore in the connection pipe to said bearing bore in the bearing support, the bearing shaft being rotatably supported by each of said bearing bore in the connection pipe and said bearing bore in the bearing support.

2. An air intake system according to claim 1, further comprising a sectional element which is arranged proximate an interior side of the bearing support in the area of the insertion opening, wherein the sectional element supplements an inner pipe wall of the connection pipe.

3. An air intake system according to claim 2, wherein free ends of the sectional element overlap interior wall areas of the connection pipe.

4. An air intake system according to claim 1, wherein the bearing support comprises spaced fastening lugs which extend to corresponding receiving lugs of the connection pipe, fasteners being operative between the fastening lugs and the receiving lugs.

5. An air intake system according to claim 1, wherein the throttle valve and the bearing support form a prefabricated constructional unit.

6. An air intake system according to claim 1, wherein a sealing body is arranged between the connection pipe and the bearing support.

7. An air intake system according to claim 2, wherein a sealing body is arranged between a first sealing surface of the section and a second sealing surface of the bearing support.

8. An air intake system according to claim 7, wherein the sealing surfaces have a generally half-hexagon shaped cross section.

9. An air intake system according to claim 1, wherein the bearing support comprises an outer boundary which has a generally half-hexagon shaped cross section.

10. An air intake system according to claim 1, wherein the bearing support comprises webs which extend transversely to the longitudinal direction of the connection pipe and which are reinforced by ribs extending in a grid-like fashion.

11. An air intake system according to claim 1, wherein the insertion opening extends transversely to the longitudinal direction of the connection pipe.

12. An air intake system according to claim 1, wherein a linkage system operably couples the bearing shaft to a pressure element which operates the throttle valve.

13. An air intake system according to claim 3, wherein the bearing support comprises spaced fastening lugs which extend to corresponding receiving lugs of the connection pipe, fasteners being operative between the fastening lugs and the receiving lugs.

14. An air intake system according to claim 13, wherein the throttle valve and the bearing support form a prefabricated constructional unit.

15. An air intake system according to claim 14, wherein a sealing body is arranged between the connection pipe and the bearing support.

16. An air intake system according to claim 15, wherein the bearing support comprises an outer boundary which has a generally half-hexagon shaped cross section.

17. An air intake system according to claim 16, wherein the bearing support comprises webs which extend transversely to the longitudinal direction of the connection pipe and which are reinforced by ribs extending in a grid-like fashion.

18. An air intake system according to claim 17, wherein the insertion opening extends transversely to the longitudinal direction of the connection pipe.

19. An air intake system according to claim 18, wherein a linkage system operably couples the bearing shaft to a pressure element which operates the throttle valve.

20. An air intake system according to claim 16, wherein a linkage system operably couples the bearing shaft to a pressure element which operates the throttle valve.

* * * * *